US012672944B2

(12) United States Patent
Saito et al.

(10) Patent No.: US 12,672,944 B2
(45) Date of Patent: Jul. 7, 2026

(54) DENTAL PROSTHETIC COLOR ESTIMATION METHOD, INFORMATION PROCESSING APPARATUS, DENTAL PROSTHETIC MANUFACTURING METHOD, INFORMATION PROCESSING METHOD, AND STORAGE MEDIUM

(71) Applicant: CANON KABUSHIKI KAISHA, Tokyo (JP)

(72) Inventors: Hiroshi Saito, Kanagawa (JP); Yoshihiko Matsumura, Tokyo (JP); Naru Komatsu, Tokyo (JP); Ryuta Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 18/476,130

(22) Filed: Sep. 27, 2023

(65) Prior Publication Data

US 2024/0016587 A1 Jan. 18, 2024

Related U.S. Application Data

(63) Continuation of application No. PCT/JP2022/012232, filed on Mar. 17, 2022.

(30) Foreign Application Priority Data

Mar. 29, 2021 (JP) ................................. 2021-054921
Apr. 23, 2021 (JP) ................................. 2021-073556

(51) Int. Cl.
*A61C 13/08* (2006.01)
*G06T 7/00* (2017.01)

(52) U.S. Cl.
CPC .......... *A61C 13/082* (2013.01); *G06T 7/0012* (2013.01); *G06T 2207/30036* (2013.01)

(58) Field of Classification Search
None
See application file for complete search history.

(56) References Cited

U.S. PATENT DOCUMENTS 7,871,268 B2     1/2011  Touchstone
2006/0147874 A1  7/2006  Touchstone
2006/0177792 A1  8/2006  Touchstone
(Continued)

FOREIGN PATENT DOCUMENTS

JP          2008526369 A      7/2008
JP      WO2009154301 A1     12/2009
(Continued)

*Primary Examiner* — Mark R Milia
(74) *Attorney, Agent, or Firm* — Canon U.S.A., Inc. IP Division

(57) ABSTRACT

The present invention is directed to providing a color estimation method for estimating color of a dental prosthetic and a dental prosthetic manufacturing method for coloring the dental prosthetic based on the estimated color. A dental prosthetic color estimation method of the present invention includes acquiring color information about teeth, the color information being obtained by using an imaging unit, and estimating color of a surface of a dental prosthetic based on color information about at least one of a target tooth for the dental prosthetic to be disposed, a tooth near the target tooth, and a tooth corresponding to the target tooth.

28 Claims, 16 Drawing Sheets

(56)                    References Cited

U.S. PATENT DOCUMENTS

| | | | |
|---|---|---|---|
| 2008/0090197 A1 | 4/2008 | Touchstone | |
| 2009/0133260 A1 | 5/2009 | Durbin et al. | |
| 2013/0244197 A1* | 9/2013 | Tjioe | G01J 3/508 |
| | | | 433/29 |
| 2021/0244518 A1* | 8/2021 | Ryu | G06T 19/20 |
| 2022/0168080 A1 | 6/2022 | Ito et al. | |

FOREIGN PATENT DOCUMENTS

| | | | |
|---|---|---|---|
| JP | 2010220882 A | 10/2010 |
| JP | 2012024395 A | 2/2012 |
| WO | 2008142781 A1 | 11/2008 |
| WO | 2020189745 A1 | 9/2020 |

* cited by examiner

1

DENTAL PROSTHETIC COLOR ESTIMATION METHOD, INFORMATION PROCESSING APPARATUS, DENTAL PROSTHETIC MANUFACTURING METHOD, INFORMATION PROCESSING METHOD, AND STORAGE MEDIUM

CROSS-REFERENCE TO RELATED APPLICATIONS

This application is a Continuation of International Patent Application No. PCT/JP2022/012232, filed Mar. 17, 2022, which claims the benefit of Japanese Patent Applications No. 2021-054921, filed Mar. 29, 2021, and No. 2021-073556, filed Apr. 23, 2021, all of which are hereby incorporated by reference herein in their entirety.

BACKGROUND OF THE INVENTION

Field of the Invention

The present invention relates to an estimation method and an information processing apparatus for estimating color of a dental prosthetic, a dental prosthetic manufacturing method for performing coloring using estimated color data, and an information processing apparatus, an information processing method, and a storage medium storing a program for inferring color of a dental prosthetic using a trained model.

Background Art

Dental prosthetics such as an inlay, a crown, and a bridge have conventionally been cast or otherwise manually fabricated by denturists. By contrast, a computer-aided design/computer-aided manufacturing (CAD/CAM) system that designs dental prosthetics such as an inlay, a crown, and a bridge using a computer and fabricates the dental prosthetics by cutting has been attracting attention (Patent Literature 1).

The CAD/CAM system discussed in Patent Literature 1 reads information about the three-dimensional shape of an abutment tooth or a cavitied tooth, and sometimes information about the three-dimensional shapes of adjacent teeth and opposing teeth. A dental prosthetic is discussed to be fabricated by designing the intended dental prosthetic based on the read information about the tooth shape and the like using the computer, and cutting a block-shaped material such as a cured resin article, sintered ceramic, and metal body set in an automatic cutting machine.

CITATION LIST

Patent Literature

PTL 1: Japanese Patent Application Laid-Open No. 2002-224142

According to Patent Literature 1, the dental prosthetic is formed by cutting a block material based on the three-dimensional shape information about the tooth and the like using a computer-aided design/computer-aided manufacturing (CAD/CAM) system, whereas the dental prosthetic is manually colored and costs high. The present invention is directed to providing a color estimation method for estimating color of a dental prosthetic, an information processing apparatus for performing the estimation method, a dental prosthetic manufacturing method for coloring a dental prosthetic based on estimated color, and an information processing apparatus, an information processing method, and a program for inferring color of a dental prosthetic using a trained inference model.

SUMMARY OF THE INVENTION

A dental prosthetic color estimation method of the present invention includes acquiring color information about teeth, the color information being obtained by using an imaging unit, and estimating color of a surface of a dental prosthetic by a computing unit based on color information about at least one of a target tooth for the dental prosthetic to be disposed, a tooth near the target tooth, and a tooth corresponding to the target tooth.

Further features of the present invention will become apparent from the following description of exemplary embodiments with reference to the attached drawings.

DESCRIPTION OF THE EMBODIMENTS

Preferred exemplary embodiments of the present invention will be described below with reference to the attached drawings.

3

First Exemplary Embodiment

Figure 1:
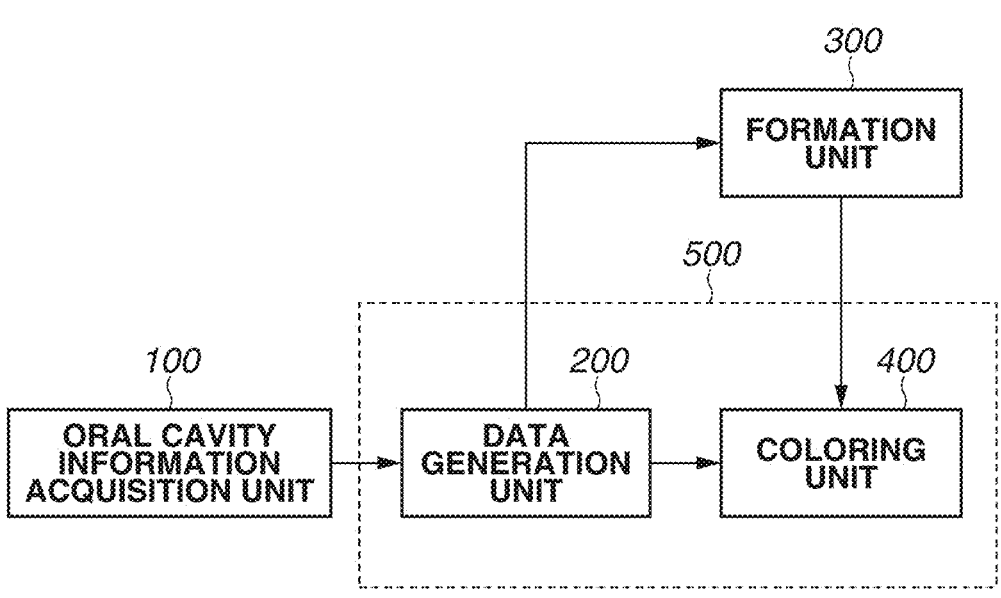
FIG. 1 is a diagram illustrating a configuration of a dental prosthetic manufacturing system according to the present invention.

FIG. 1 illustrates a configuration of a dental prosthetic manufacturing system according to the present invention.

The dental prosthetic manufacturing system of the present invention includes an oral cavity information acquisition unit 100 that acquires oral cavity information, and a data generation unit 200 that generates three-dimensional shape data and color data on a dental prosthetic based on the acquired oral cavity information. The dental prosthetic manufacturing system further includes a formation unit 300 that forms a dental prosthetic based on the generated three-dimensional shape data, and a coloring unit 400 that colors the surface of the formed dental prosthetic based on the generated color data. Here, the data generation unit 200 according to the present invention and the coloring unit 400 that performs coloring based on the color data generated by the data generation unit 200 function as a dental prosthetic coloring system 500. In other words, the coloring system includes the data generation unit 200 that generates tooth color data based on tooth color information and the coloring unit 400 that colors the surface of the formed dental prosthetic based on the color data. The formation unit 300 and the coloring unit 400 may be constituted by the same apparatus that performs both processes.

Figure 2:
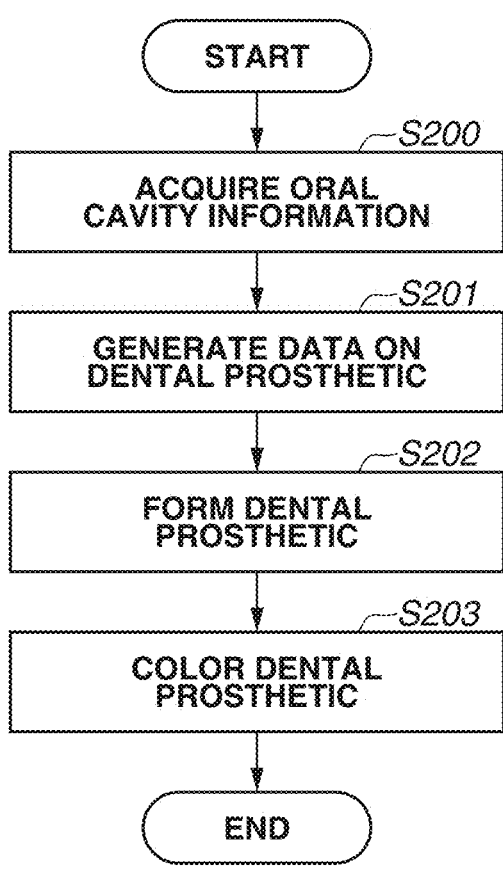
FIG. 2 is a chart illustrating a generation procedure of a dental prosthetic according to the present invention.

A generation procedure of a dental prosthetic by the dental prosthetic manufacturing system illustrated in FIG. 2 will be described below with reference to the image diagram of FIG. 3.

In step S200, the oral cavity information acquisition unit 100 acquires oral cavity information about a subject from a storage device or the like. The information for the oral cavity information acquisition unit 100 to acquire includes tooth three-dimensional shape information and tooth color information. The oral cavity information acquisition unit 100 transmits the acquired oral cavity information to the data generation unit 200. Here, the oral cavity information for the oral cavity information acquisition unit 100 to acquire may be oral cavity information that is captured by using an imaging unit such as an oral cavity scanner (see an image 301 of FIG. 3) and transmitted from an imaging apparatus. FIG. 3 illustrates the image 301 of the acquisition of oral cavity information about a subject. The oral cavity information acquisition unit 100 acquires the oral cavity information about the subject, captured by the imaging unit.

In step S201, a computing unit of the data generation unit 200 estimates the color of the surface of the dental prosthetic based on the oral cavity information. The data generation unit 200 further estimates the three-dimensional shape of the dental prosthetic from the oral cavity information, and generates tooth three-dimensional shape data and tooth color data based on the estimated color and shape (see an image 302 of FIG. 3). The data generation unit 200 may estimate the three-dimensional shape of the dental prosthetic and generate the tooth three-dimensional shape data based on a difference between master information about tooth shapes and the transmitted tooth three-dimensional shape information, for example. Having generated the tooth three-dimensional shape data and the tooth color data, the data generation unit 200 transmits the generated three-dimensional shape data to the formation unit 300 and transmits the color data to the coloring unit 400.

Figure 3:
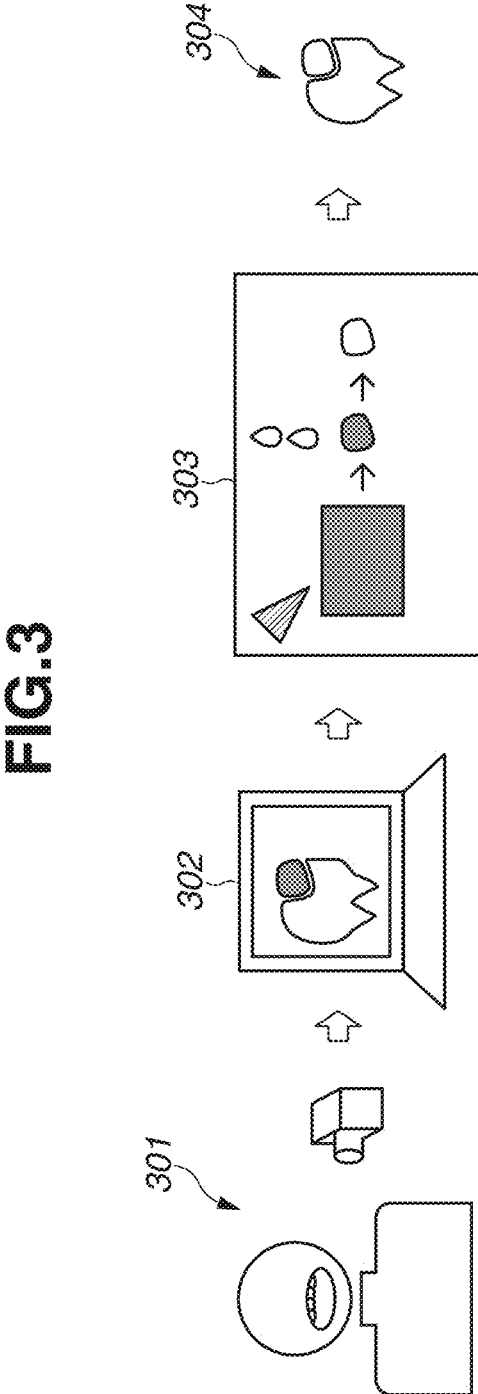
FIG. 3 is an image diagram of the generation procedure of the dental prosthetic according to the present invention.

FIG. 3 illustrates the image 302 where a dental prosthetic is illustrated in dark color and an existing tooth in light color. As will be described below, the data generation unit 200 estimates the color for the surface of the dental prosthetic to be colored, and generates data on the dental prosthetic based on the estimated color.

The data generation unit 200 generates the tooth three-dimensional shape data and the tooth color data based on the oral cavity information acquired by the oral cavity information acquisition unit 100. The tooth three-dimensional shape data and color data generated by the data generation unit 200 may be mutually related pieces of data. As will be described in detail below, for example, the computing unit estimates the color of the surface of the dental prosthetic based on color information about at least one of a target tooth of the dental prosthetic, teeth near the target tooth, and a tooth corresponding to the target tooth. The color may be estimated based on the tooth three-dimensional shape information. In such a case, since the color data generated by the data generation unit 200 is based on the tooth three-dimensional shape information and color information, the three-dimensional shape data and color data to be generated are configured to have a correlation therebetween.

In step S202, the formation unit 300 forms a dental prosthetic by the formation unit 300 cutting and/or grinding a dental prosthetic base material based on the acquired tooth three-dimensional shape data. With the dental prosthetic formed by the formation unit 300, the formed dental prosthetic is delivered to the coloring unit 400.

In step S203, the coloring unit 400 colors the surface of the dental prosthetic obtained from the formation unit 300 based on the acquired color data on the dental prosthetic. FIG. 3 illustrates an image 303 where the dental prosthetic is formed of a dental prosthetic base material by the formation unit 300 and the formed dental prosthetic is colored by the coloring unit 400.

By this procedure, the dental prosthetic coloring system 500 of the present invention can color the formed dental prosthetic. The coloring of the dental prosthetic by this coloring system 500 can generate a dental prosthetic of high conformity as illustrated in an image 304 of FIG. 3.

Figure 4:
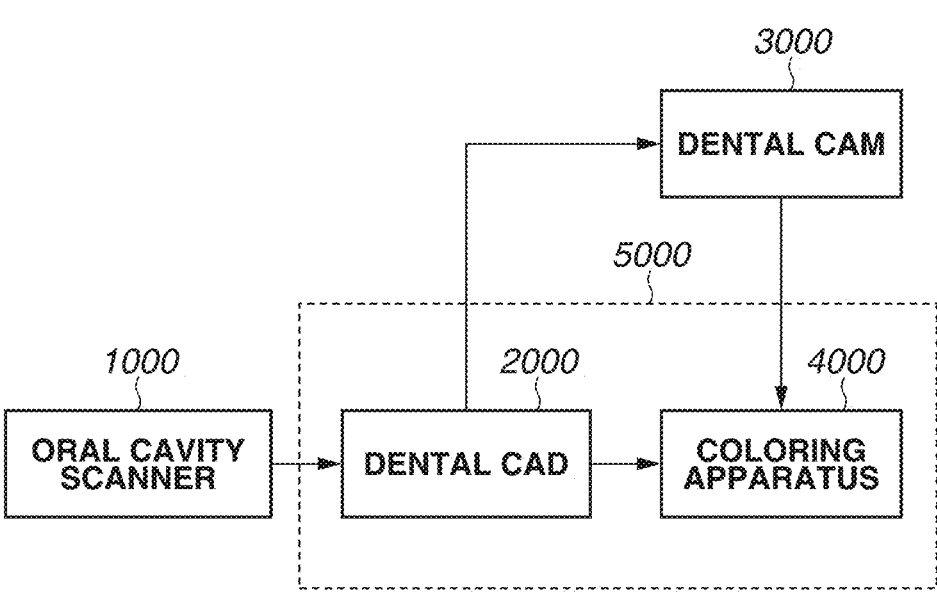
FIG. 4 is a schematic diagram of examples of apparatuses for implementing components of the dental prosthetic manufacturing system according to the present invention.

Now, examples of apparatuses for implementing the components of the dental prosthetic manufacturing system will be described with reference to FIG. 4. For example, the function of the oral cavity information acquisition unit 100 is implemented by an oral cavity scanner 1000 (to be described below with reference to FIG. 5). Oral cavity information captured by the oral cavity scanner 1000 is transmitted to a dental computer-aided design (CAD) 2000 (to be described below with reference to FIG. 6) having the function of the data generation unit 200. Dental prosthetic three-dimensional shape data generated by the dental CAD 2000 is transmitted to a dental computer-aided manufacturing (CAM) 3000 (to be described below with reference to FIG. 8) having the function of the formation unit 300. Color data generated by the dental CAD 2000 is transmitted to a coloring apparatus 4000 (to be described below with reference to FIG. 10) having the function of the coloring unit 400. The dental CAD 2000 and the coloring apparatus 4000 may be integrated to function as a dental prosthetic coloring system 5000. Note that the apparatuses for implementing the components of the dental prosthetic manufacturing system are not limited to the foregoing. The apparatuses constituting the dental prosthetic manufacturing system mentioned above will now be described.

<Oral Cavity Scanner 1000>

Figure 5:
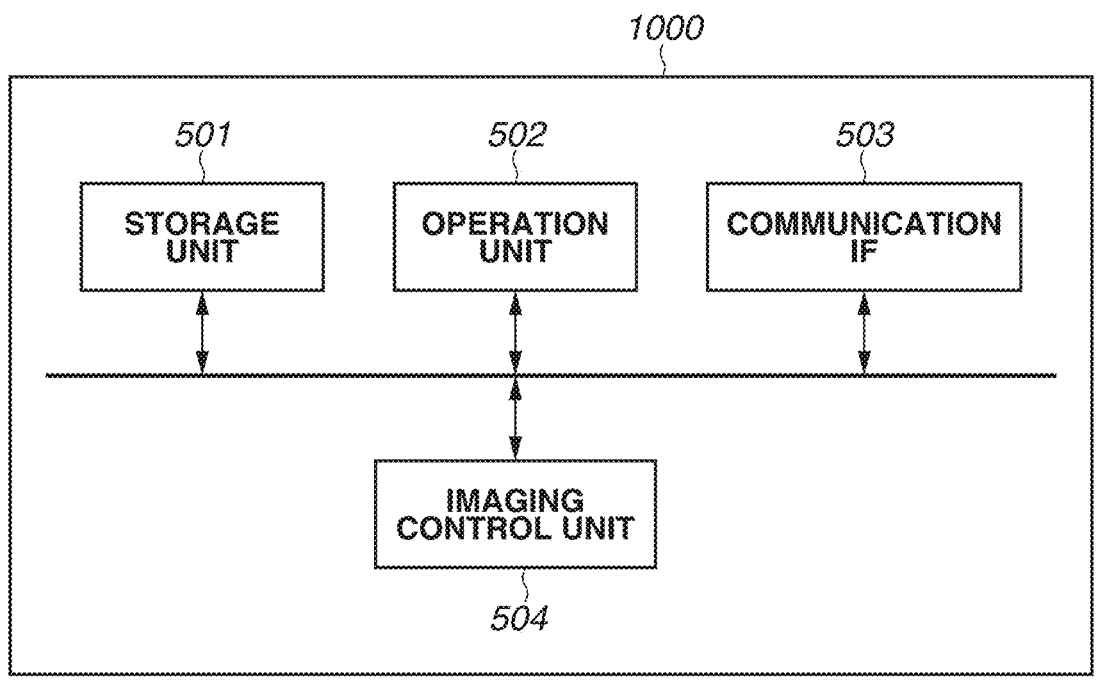
FIG. 5 is a schematic diagram of an oral cavity scanner 1000 according to the present invention.

Initially, a schematic diagram of the oral cavity scanner 1000 implementing the function of the oral cavity information acquisition unit 100 in the dental prosthetic manufacturing system will be described with reference to FIG. 5. The oral cavity scanner 1000 includes a storage unit 501, an operation unit 502, a communication interface (IF) 503, and an imaging control unit 504. The storage unit 501 stores acquired tooth information and the like. The operation unit 502 accepts operations made by the user. The communication IF 503 is implemented by a local area network (LAN) card or the like, and controls communication with an external apparatus (for example, dental CAD 2000). The imaging control unit 504 acquires tooth three-dimensional shape information and tooth color information. Here, the imaging control unit 504 may acquire the tooth three-dimensional shape information and color information simultaneously or separately. The tooth three-dimensional shape information and color information acquired by the imaging control unit 504 may be constructed by respective independent apparatuses.

The tooth three-dimensional shape information and color information acquired by the imaging control unit 504 are stored in the storage unit 501, and transmitted to the dental CAD 2000 by using the communication IF 503. The oral cavity information acquisition unit 100 may be implemented by an apparatus that acquires oral cavity information captured in advance from a storage device or the like. The oral cavity scanner 1000 is a scanner for acquiring oral cavity information and does not necessarily need to be inserted into the oral cavity for imaging. For example, the oral cavity information acquisition unit 100 may acquire tooth three-dimensional shape information by taking an impression of the oral cavity and scanning the impression.

<Dental CAD 2000>

Figure 6:
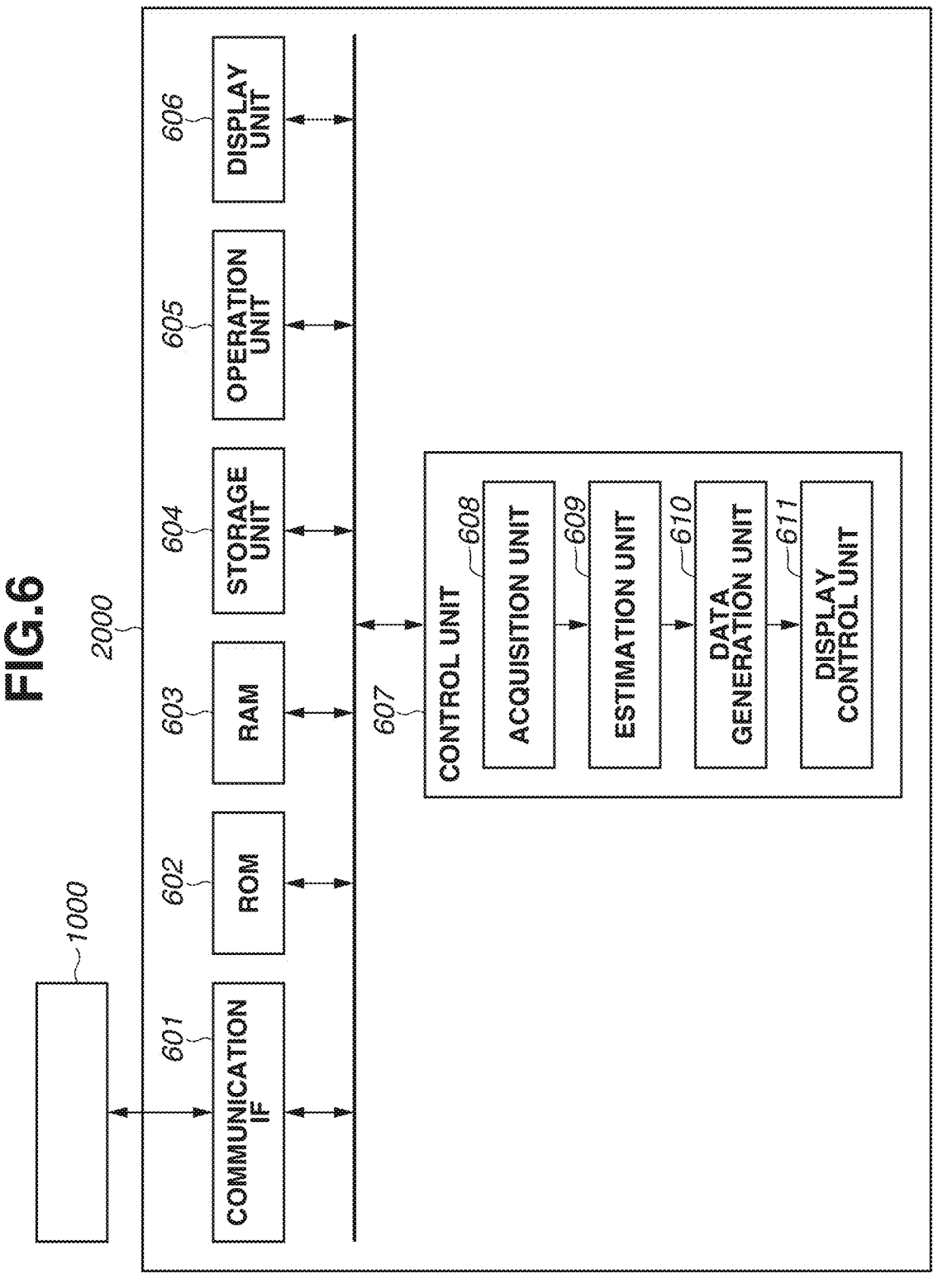
FIG. 6 is a schematic diagram of a dental computer-aided design (CAD) 2000 according to the present invention.

Next, an example of a schematic diagram of the dental CAD 2000 that is an information processing apparatus for implementing the function of the data generation unit 200 in the dental prosthetic manufacturing system will be given. As illustrated in FIG. 6, the dental CAD 2000 is an information processing apparatus including a communication IF 601, a ROM 602, a RAM 603, a storage unit 604, an operation unit 605, a display unit 606, and a control unit 607.

The communication IF 601 is implemented by a LAN card or the like, and controls communication with the oral cavity scanner 1000, the dental CAM 3000, and the coloring apparatus 4000 outside. If communication does not need to be performed, the communication IF 601 is a dispensable component. The ROM 602 is implemented by a nonvolatile memory or the like, and stores various programs and the like. The RAM 603 is implemented by a volatile memory or the like, and temporarily stores various types of information. The storage unit 604 is implemented by a hard disk drive (HDD), a solid state drive (SSD), or the like, and stores various types of information. The operation unit 605 is implemented by a keyboard, a mouse, and the like. The display unit 606 is implemented by a display or the like, and displays various types of information to the user. The operation unit 605 and the display unit 606 may function as components of the dental CAD 2000 as illustrated in this diagram, or constituted by devices different from the dental CAD 2000.

The control unit 607 includes an acquisition unit 608 that acquires the tooth color information obtained by using an imaging unit, and an estimation unit 609 that estimates the color of the surface of the dental prosthetic using a computing unit based on color information about at least one of a target tooth for the dental prosthetic to be disposed, teeth near the target tooth, and a tooth corresponding to the target tooth. The control unit 607 also includes a data generation unit 610 that generates data on the dental prosthetic based on the estimated color and three-dimensional shape of the dental prosthetic, and a display control unit 611 for performing display processing of the generated data on the display unit 606.

Figure 7:
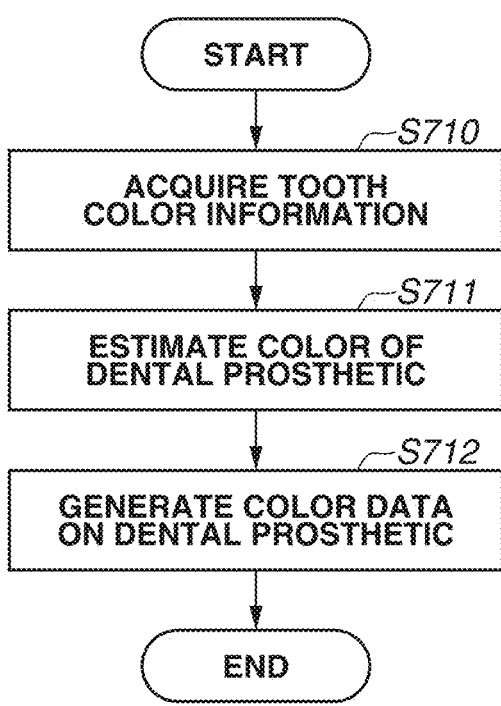
FIG. 7 is a flowchart of data generation of a dental prosthetic by the dental CAD according to the present invention.

Now, a generation procedure of the data on the dental prosthetic by the dental CAD 2000 will be described with reference to FIG. 7. The components of the dental CAD 2000 may be constituted by a plurality of apparatuses. Only some of the components may be configured as an actual apparatus.

In step S710, the acquisition unit 608 acquires the tooth color information obtained by using the imaging unit. Having acquired the tooth color information, the acquisition unit 608 transmits the tooth color information to the estimation unit 609. This step ends.

In step S711, the estimation unit 609 estimates the color of the surface of the dental prosthetic based on color information about at least one of a target tooth for the dental prosthetic to be disposed, teeth near the target tooth, and a tooth corresponding to the target tooth. The estimation unit 609 transmits information about the estimated color of the surface of the dental prosthetic to the data generation unit 610. This step ends. The target tooth refers to a tooth having a missing part. The nearby teeth refer to teeth adjoining the target tooth in the tooth row on the same jaw as the upper or lower jaw where the target tooth is located. The corresponding tooth refers to a tooth at the position of occlusion with the target tooth, in the tooth row on the jaw different from the upper or lower jaw where the target tooth is located.

The target tooth, the nearby teeth, and the corresponding tooth to serve as the input for the estimation by the estimation unit 609 may be specified by the user or by a conventional image processing technique.

The estimation unit 609 estimates the color of the surface of the dental prosthetic using brightness data generated based on brightness information about at least one of the target tooth for the dental prosthetic to be disposed, the teeth near the position where the dental prosthetic is to be disposed, and the tooth corresponding to the tooth for the dental prosthetic to be disposed. In such a case, the estimation unit 609 estimates the color of the surface of the dental prosthetic between the maximum and minimum values of the generated brightness data.

The estimation unit 609 may perform processing for determining a missing tooth as the target tooth by using an image processing technique. The estimation unit 609 further calculates the degree of missing of the missing part of the target tooth, and estimates the color of the surface of the dental prosthetic based on the degree of missing. For example, in a case where the degree of missing is high, the estimation unit 609 estimates the color by making the weights of the color information about the corresponding tooth and the nearby teeth in estimation, higher than that of the color information about the target tooth, higher than in a case where the degree of missing is low. By contrast, in the case where the degree of missing is low, the estimation unit 609 estimates the color by making the weight of the color information about the target tooth in the color estimation, higher than those of the color information about the corresponding tooth and the nearby teeth, higher than in the case where the degree of missing is high. Moreover, the estimation unit 609 estimates the tooth color of the surface of the dental prosthetic by interpolating the color of the missing part based on the color information about the target tooth, the corresponding tooth, and/or the nearby teeth. For example, an average color value of the color information about a plurality of teeth may be estimated as the color of the dental prosthetic.

For example, the estimation unit 609 stores a tooth color model associating tooth color with three-dimensional shape information, and estimates the color of the dental prosthetic by inputting color information into the color model.

The color of the surface of the dental prosthetic estimated by the estimation unit 609 may include color having a hue b* lower than a hue b* in the chromaticity coordinates defined by the International Commission on Illumination (CIE) 1976 L*a*b* color system. Of colors estimated by the estimation unit 609, one having a low hue b* is assigned to a part of the surface of the dental prosthetic. Such color assignment to the tooth tip and nearby areas that are the part of the dental prosthetic is aesthetically excellent and more desirable.

In step S712, the data generation unit 610 generates color data on the dental prosthetic based on the transmitted information about the color of the dental prosthetic, and displays the generated color data on the display unit 606 via the display control unit 611. The generated color data is also transmitted to the coloring apparatus 4000. As will be described below, the coloring apparatus 4000 colors a formed dental prosthetic based on the estimated color information.

Here, the estimation unit 609 may estimate a plurality of candidates for the color of the surface of the dental prosthetic. In such a case, the display control unit 611 displays the plurality of color candidates for the surface of the dental prosthetic on the display unit 606. The control unit 607 may perform selection acceptance by which the user can select color data from the plurality of color candidates via the operation unit 605 and the like. The plurality of candidates for the color data displayed on the display unit 606 may be displayed with matching scores with the color information about at least one of the tooth for the dental prosthetic to be disposed, the teeth near the position where the dental prosthetic is to be disposed, and the tooth corresponding to the tooth for the dental prosthetic to be disposed.
(Modification 1)

The acquisition unit 608 may further acquire the tooth three-dimensional shape information. In such a case, the estimation unit 609 is configured to estimate the color of the surface of the dental prosthetic based on the two pieces of information, the tooth color information and three-dimensional shape information, whereby the estimation accuracy is expected to be improved. The information generated by the data generation unit 610 includes the three-dimensional shape data on the dental prosthetic in addition to the color data on the dental prosthetic, and the dental CAM 3000 to be described below may form the dental prosthetic based on the three-dimensional shape data. If the estimation unit 609 acquires the three-dimensional shape information, the estimation unit 609 may generate appearance prediction data on the dental prosthetic seen from outside the oral cavity of the subject based on the position or orientation where the dental prosthetic is disposed, and estimate the color of the surface of the dental prosthetic based on the appearance prediction data. The estimation unit 609 may estimate the color of the surface of the dental prosthetic based on at least one of layout information about a light source, the intensity of light emitted from the light source, the frequency of the light, and the tint of the light.
<Dental CAM 3000>

Figure 8:
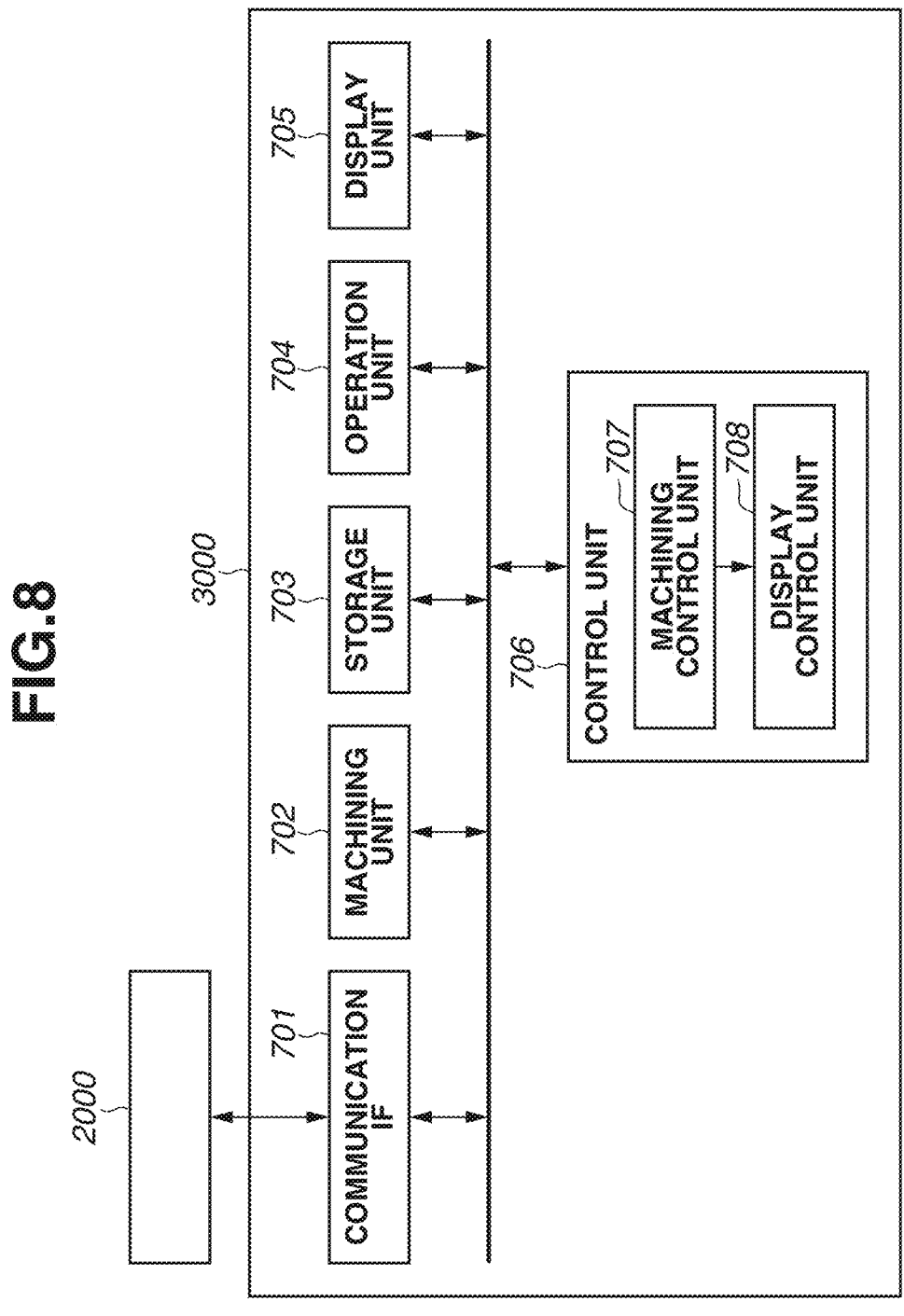
FIG. 8 is a schematic diagram of a dental computer-aided manufacturing (CAM) 3000 according to the present invention.
Figure 9:
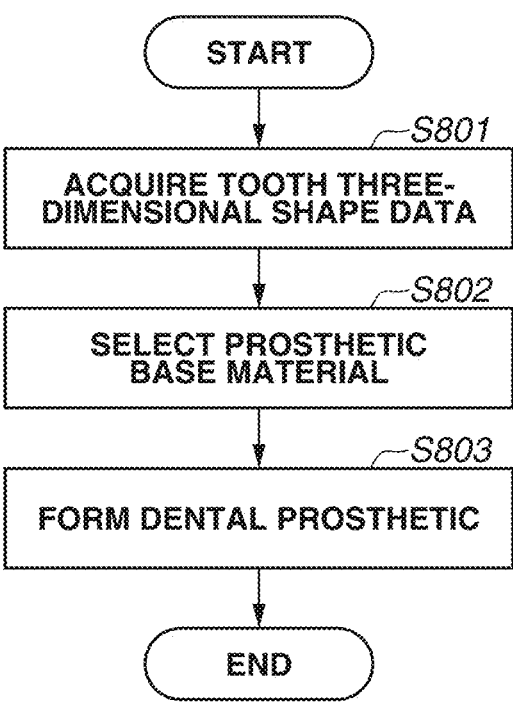
FIG. 9 is a chart for describing a formation procedure of a dental prosthetic according to the present invention.

An example of the configuration of the dental CAM 3000 will be described with reference to FIG. 8. A process for forming a dental prosthetic will be described with reference to FIG. 9.

The dental CAM 3000 includes a communication IF 701, a machining unit 702, a storage unit 703, an operation unit 704, a display unit 705, and a control unit 706. The control unit 706 includes a machining control unit 707 and a display control unit 708.

In step S801, the dental CAM 3000 receives the three-dimensional shape data generated by the dental CAD 2000 via the communication IF 701. The received three-dimensional shape data is stored in the storage unit 703. The dental CAM 3000 may further acquire the tooth color data. The tooth color data is used in the step described below.

In step S802, the dental CAM 3000 selects a desirable prosthetic base material based on the received three-dimensional shape data and color data. The selection of the prosthetic base material may be replaced with the selection of the base material by the user. In a case such as where a prosthetic base material is set in advance, this step may be omitted as appropriate. The prosthetic base material selected by the dental CAM 3000 here is desirably a prosthetic base material similar to the tooth color data received from the dental CAD 2000 by the dental CAM 3000. For example, a prosthetic base material that is similar to the color data and has a high degree of whiteness is selected as the base material of the dental prosthetic. The base material of the dental prosthetic may contain ceramic and/or a resin.

In step S803, the dental CAM 3000 forms the dental prosthetic by controlling the machining unit 702 using the machining control unit 707 constituting the control unit 706 based on the received three-dimensional shape data to machine the dental prosthetic base material. The result of the machining and formation by the machining unit 702 can be displayed on the display unit 705 via the display control unit 708. Here, the machining unit 702 may form the dental prosthetic by cutting and/or grinding the prosthetic base material. The machining unit 702 may machine and form the dental prosthetic by repeating successive sintering or melting and curing of the material, or the prosthetic base material, by light irradiation. The machining unit 702 may form the dental prosthetic by additive manufacturing. The control unit 706 may be controlled via the operation unit 704. The dental prosthetic formed by the dental CAM 3000 is used in a coloring process by the coloring apparatus 4000.
<Coloring Apparatus 4000>

Figure 10:
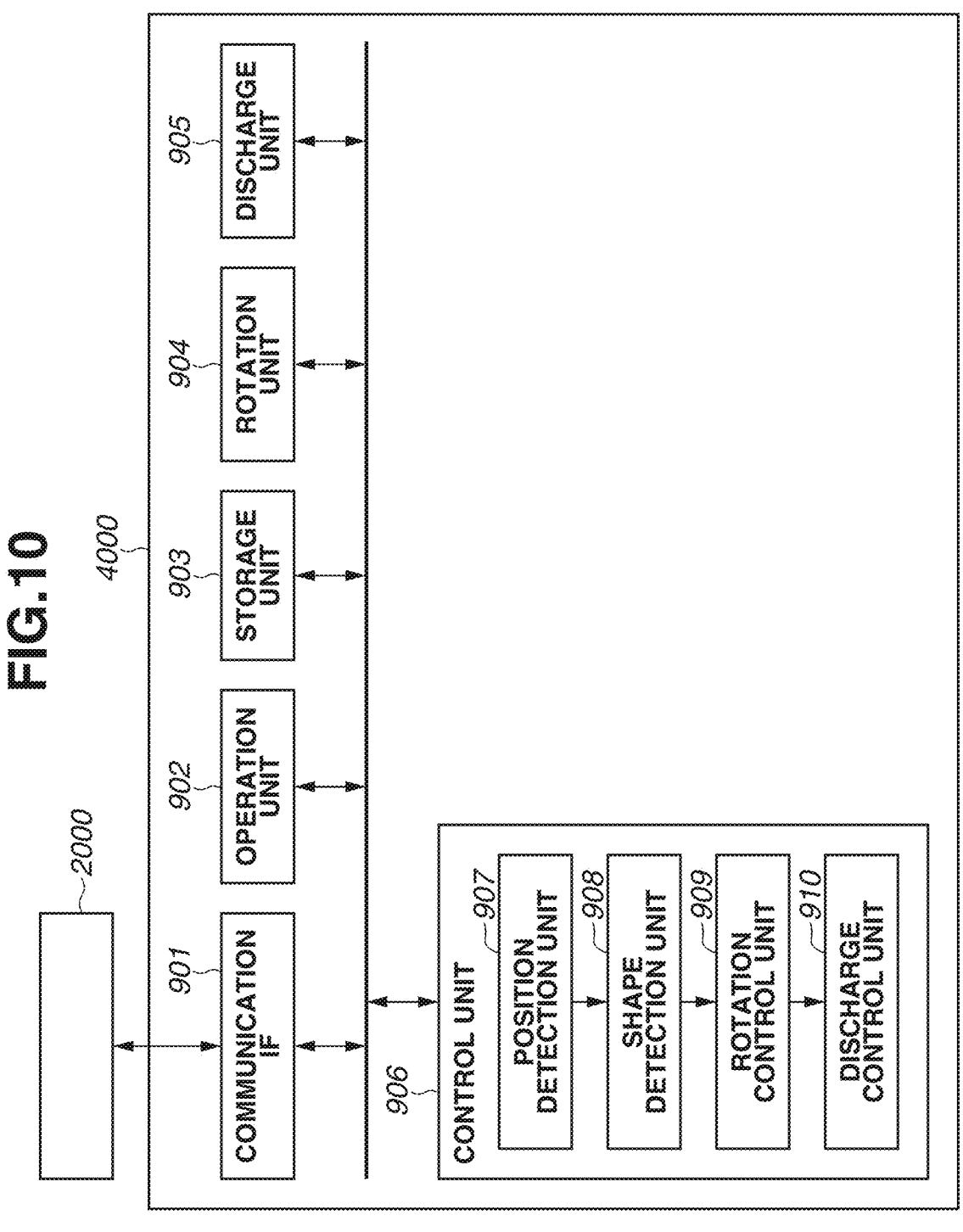
FIG. 10 is a schematic diagram of a coloring apparatus 4000 according to the present invention.

An example of the coloring apparatus 4000 for implementing the function of the coloring unit 400 in the dental prosthetic manufacturing system will be described with reference to FIG. 10. The coloring process of the dental prosthetic by this apparatus will be described with reference to FIG. 11.

The coloring apparatus 4000 includes a communication IF 901, an operation unit 902, a storage unit 903, a rotation unit 904, a discharge unit 905, and a control unit 906. The control unit 906 includes a position detection unit 907, a shape detection unit 908, a rotation control unit 909, and a discharge control unit 910.

Figure 11:
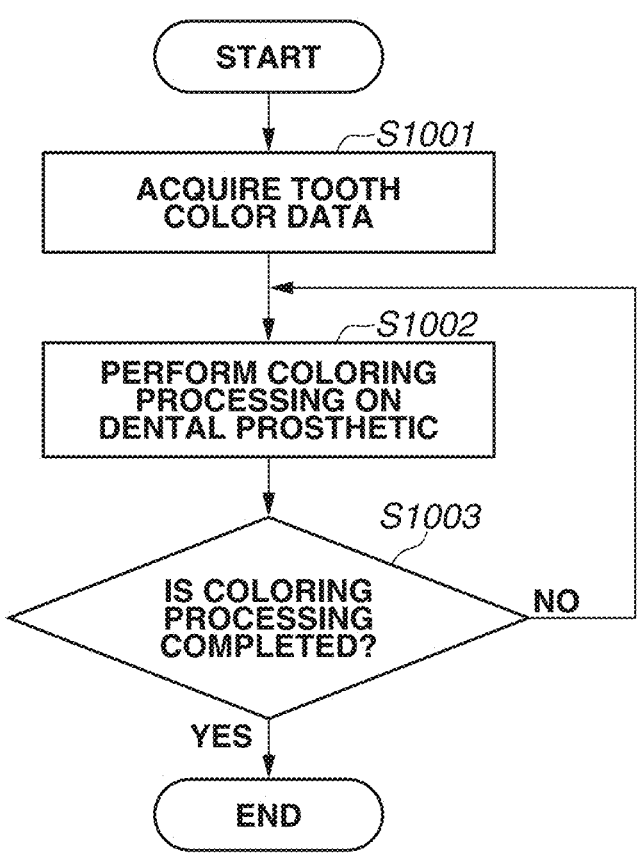
FIG. 11 is a chart for describing a coloring procedure of a dental prosthetic according to the present invention.

A specific example of the process for coloring the formed dental prosthetic based on the color data generated by the data generation unit 200 will now be described with reference to FIG. 11.

In step S1001, the coloring apparatus 4000 receives the color data on the dental prosthetic generated by the dental CAD 2000 via the communication IF 901.

The coloring apparatus 4000 records the received color data in the storage unit 903. The coloring apparatus 4000 holds the dental prosthetic machined and formed by the dental CAM 3000 with the rotation unit 904. The position detection unit 907 detects position data on the dental prosthetic machined and formed by the dental CAM 3000. The shape detection unit 908 detects the shape of the dental prosthetic by receiving the position data on the dental prosthetic detected by the position detection unit 907 or the three-dimensional data from the dental CAD 2000. To combine the position data detected by the position detection unit 907 with the received three-dimensional shape data improves the detection accuracy of the shape of the dental prosthetic by the shape detection unit 908. The detection of the shape of the dental prosthetic by the shape detection unit 908 may be substituted by the reception of the three-dimensional shape data.

In step S1002, the coloring apparatus 4000 colors the surface of the dental prosthetic formed by the formation apparatus 3000 based on the color data generated by the dental CAD 2000. Specifically, the coloring apparatus 4000 colors the dental prosthetic machined and formed by the dental CAM 3000 with a coloring material based on the color data while controlling the rotation unit 904 using the rotation control unit 909 and controlling the discharge unit 905 using the discharge control unit 910 based on the shape of the dental prosthetic detected by the shape detection unit 908. With the dental prosthetic colored, the processing proceeds to step S1003. The discharge unit 905 may discharge the coloring material by inkjetting or spraying. The discharge unit 905 can use inkjetting if the amount of the coloring material is small. The discharge unit 905 can use spraying if the amount of the coloring material is large. The discharge unit 905 may include an inkjet mechanism and a spray mechanism as switchable mechanisms. The coloring apparatus 4000 may use two or more types of coloring materials to color the dental prosthetic for improved reproducibility of the color data on the dental prosthetic. The coloring apparatus 4000 may further include an application unit (not illustrated) that applies the coloring material to the dental prosthetic. If the coloring apparatus 4000 applies the coloring material, the application unit may perform multilayer application using a plurality of different coloring materials. The multilayer application by the application unit improves the coloring reproducibility of the color data on the dental prosthetic. Moreover, coloring materials having respective different refractive indices may be used as the plurality of coloring materials. The use of coloring materials with different refractive indices in coloring the dental prosthetic enhances reflectance, and coloring reproducibility can be achieved with a small amount of application. The coloring material for the coloring apparatus 4000 to color the dental prosthetic with may be selected by referencing a lookup table linking tooth color data with coloring materials. If the coloring apparatus 4000 has the lookup table in advance, the computing cost related to the determination of the coloring material can be reduced. The coloring material may contain any one of B, Si, and a resin. The inclusion of B, Si, or the resin into the coloring material for coloring the dental prosthetic can provide a wide color space.

The coloring material for the coloring apparatus 4000 to color the dental prosthetic with may contain a scattering agent. The coloring using the scattering agent-containing coloring material can achieve coloring reproducibility with a smaller amount of application. A scattering agent having a high refractive index may be used as the scattering agent. At least one of $TiO_2$, $SiO_2$, and $ZrO_2$ may be included as the scattering agent having a high refractive index.

In step S1003, the coloring apparatus 4000 determines whether the coloring processing is completed. If the coloring processing is determined to be completed, this processing ends. If the coloring processing is determined to not be completed, the processing proceeds to step S1002 to perform coloring processing.

Second Exemplary Embodiment

A configuration of a dental prosthetic manufacturing system according to a second exemplary embodiment of the present invention will be described below with reference to FIG. 1.

The dental prosthetic manufacturing system of the present invention includes an oral cavity information acquisition unit 100 that acquires oral cavity information, and a data generation unit 200 that generates three-dimensional shape data on a dental prosthetic and color data on the dental prosthetic based on the acquired oral cavity information. The dental prosthetic manufacturing system further includes a formation unit 300 that forms the dental prosthetic based on the generated three-dimensional shape data, and a coloring unit 400 that colors the surface of the formed dental prosthetic based on the generated color data. The formation unit 300 and the coloring unit 400 may be constituted by the same apparatus that performs both processes.

A generation procedure of the dental prosthetic by the dental prosthetic manufacturing system illustrated in FIG. 2 will be described below with reference to the image diagram of FIG. 3.

In step S200, the oral cavity information acquisition unit 100 acquires oral cavity information about a subject from a storage device or the like. The information for the oral cavity information acquisition unit 100 to acquire is information about a tooth row including a missing area, or image data including tooth three-dimensional shape information and tooth color information. The oral cavity information acquisition unit 100 transmits the acquired oral cavity information to the data generation unit 200 as inference target image data. Here, the oral cavity information for the oral cavity information acquisition unit 100 to acquire may be image data that is captured by using an imaging unit such as an oral cavity scanner (see the image 301 of FIG. 3). FIG. 3 illustrates the image 301 of the acquisition of oral cavity information about a subject.

In step S201, the data generation unit 200 infers the color of the dental prosthetic from the acquired inference target image data using a trained inference model. Here, the trained inference model refers to a trained inference model trained using teaching data including training image data that is captured of a tooth row including a missing area and ground truth data that is information about the color of the dental prosthetic to be disposed in the missing area in a pair. As will be described in detail below, the inference model may be a model based on a convolutional neural network (CNN) to which ground truth labels corresponding to pixel values indicating the color of the dental prosthetic are applied as ground truth data. Alternatively, the inference model may be a model based on a generative adversarial network (GAN) trained with ground truth image data as ground truth data, like pix2pix. The data generation unit 200 further generates tooth three-dimensional shape data and tooth color data (see the image 302 of FIG. 3) based on the inferred color and shape. The inference processing by the trained inference model in the data generation unit 200 and the generation of the data based on the inference processing may be provided by different apparatuses. The data generation unit 200 may infer the three-dimensional shape of the dental prosthetic and generate the tooth three-dimensional shape data based on a difference between master information about tooth shapes and the transmitted tooth three-dimensional shape information, for example. Having generated the tooth three-dimensional shape data and the tooth color data, the data generation unit 200 transmits the generated three-dimensional shape data to the formation unit 300, and transmits the inferred color data to the coloring unit 400. In the image 302 of FIG. 3, a dental prosthetic is illustrated in dark color and an existing tooth in light color.

In step S202, the formation unit 300 forms a dental prosthetic by cutting and/or grinding a dental prosthetic base material based on the acquired tooth three-dimensional shape data. With the dental prosthetic formed by the formation unit 300, the formed dental prosthetic is delivered to the coloring unit 400.

In step S203, the coloring unit 400 colors the surface of the dental prosthetic obtained from the formation unit 300 based on the color data on the dental prosthetic inferred by the obtained trained model. FIG. 3 illustrates an image 303 where the dental prosthetic is formed of a dental prosthetic base material by the formation unit 300 and the formed dental prosthetic is colored by the coloring unit 400. The coloring of the dental prosthetic by this procedure can generate a dental prosthetic of high conformity as illustrated in an image 304 of FIG. 3.

Now, examples of apparatuses for implementing the components of the dental prosthetic manufacturing system will be described with reference to FIG. 4. For example, the function of the oral cavity information acquisition unit 100 is implemented by an oral cavity scanner 1000 (to be described below with reference to FIG. 5). Oral cavity information captured by the oral cavity scanner 1000 is transmitted to an information processing apparatus 2000 (to be described below with reference to FIG. 12 and the like) having the function of the data generation unit 200. Three-dimensional shape data on the dental prosthetic generated by the information processing apparatus is transmitted to a dental CAM 3000 (to be described below with reference to FIG. 8) having the function of the formation unit 300. Color data on the dental prosthetic inferred by the trained inference model of the information processing apparatus 2000 is transmitted to a coloring apparatus 4000 (to be described below with reference to FIG. 10) having the function of the coloring unit 400. The inference of the color of the dental prosthetic by the information processing apparatus 2000 and the generation of the data on the dental prosthetic may be implemented by different apparatuses. For example, the output of the trained inference model of the information processing apparatus 2000 is transmitted to another apparatus such as a dental CAD, and the dental CAD generates data on the color, shape, and the like of the dental prosthetic. Note that the apparatuses for implementing the components of the dental prosthetic manufacturing system are not limited to the foregoing. The apparatuses constituting the dental prosthetic manufacturing system mentioned above will now be described.

<Oral Cavity Scanner 1000>

Initially, a schematic diagram of the oral cavity scanner 1000 implementing the function of the oral cavity information acquisition unit 100 in the dental prosthetic manufacturing system will be described with reference to FIG. 5. The oral cavity scanner 1000 includes a storage unit 501, an operation unit 502, a communication interface (IF) 503, and an imaging control unit 504. The storage unit 501 stores acquired tooth information and the like. The operation unit 502 accepts operations made by the user. The communication IF 503 is implemented by a LAN card or the like, and controls communication with an external apparatus (for example, dental CAD 2000). The imaging control unit 504 acquires tooth image data.

The image data acquired by the imaging control unit 504 is stored in the storage unit 501, and transmitted to the information processing apparatus 2000 as inference target image data by using the communication IF 503. The oral cavity information acquisition unit 100 may substituted by acquisition of oral cavity information captured in advance from a storage device or the like. The oral cavity scanner 1000 is a scanner for acquiring oral cavity information and does not necessarily need to be inserted into the oral cavity for imaging. For example, the oral cavity information acquisition unit 100 may acquire tooth three-dimensional shape information by taking an impression of the oral cavity and scanning the impression.

<Information Processing Apparatus 2000>

Figure 12:
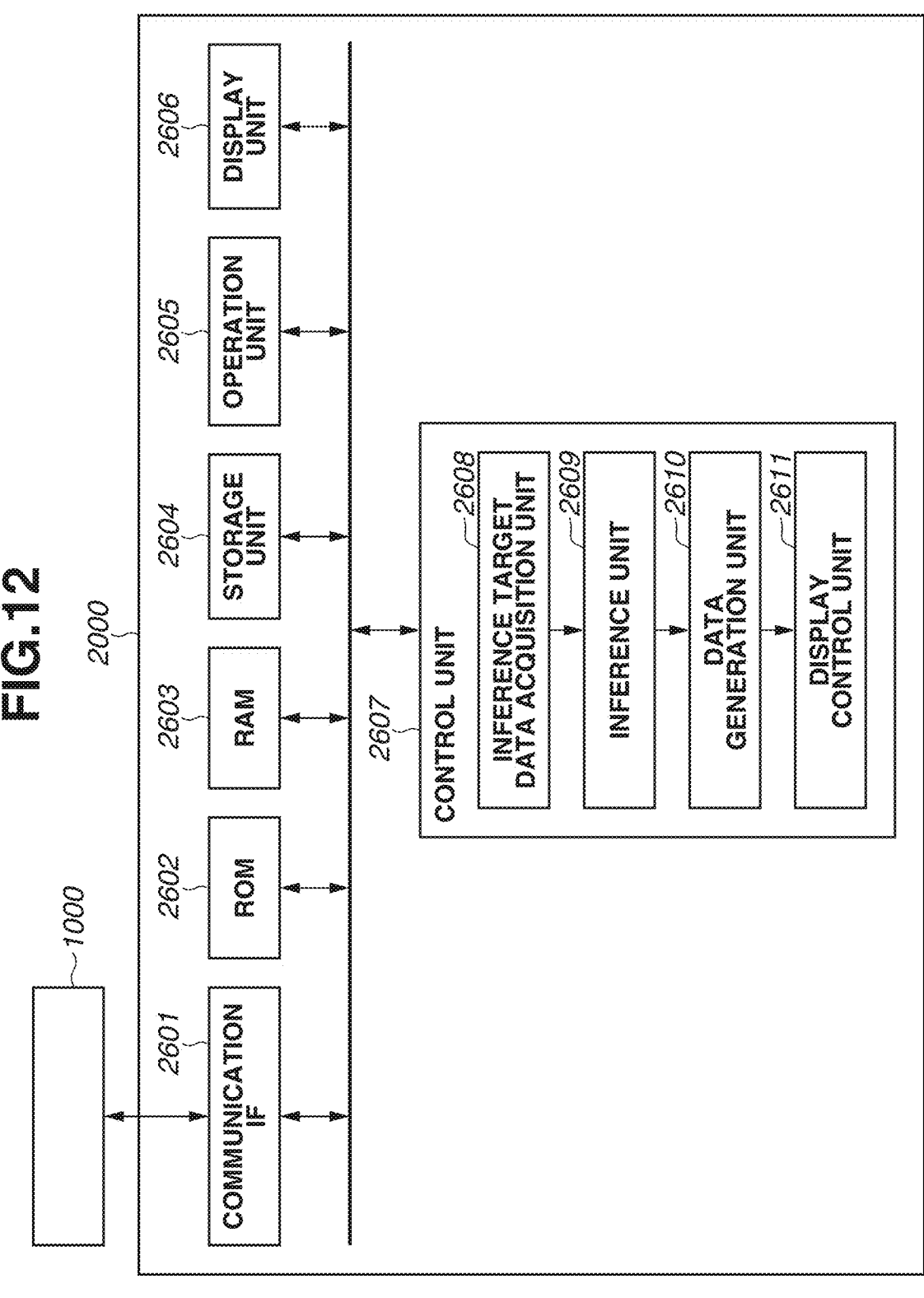
FIG. 12 is a schematic diagram of an information processing apparatus 2000 (dental CAD 2000) according to the present invention.

Next, an example of a schematic diagram of the information processing apparatus implementing the function of the data generation unit 200 in the dental prosthetic manufacturing system will be given. As illustrated in FIG. 12, the information processing apparatus 2000 includes a communication IF 2601, a ROM 2602, a RAM 2603, a storage unit 2604, an operation unit 2605, a display unit 2606, and a control unit 2607.

The communication IF 2601 is implemented by a LAN card or the like, and controls communication with the oral cavity scanner 1000, the dental CAM 3000, and the coloring apparatus 4000 outside. If communication does not need to be performed, the communication IF 2601 is a dispensable component. The ROM 2602 is implemented by a nonvolatile memory or the like, and stores various programs and the like. The RAM 2603 is implemented by a volatile memory or the like, and temporarily stores various types of information. The storage unit 2604 is implemented by a hard disk drive (HDD), a solid state drive (SSD), or the like, and stores various types of information. The operation unit 2605 is implemented by a keyboard, a mouse, and the like. The display unit 2606 is implemented by a display or the like, and displays various types of information to the user. The operation unit 2605 and the display unit 2606 may function as components of the dental CAD 2000 as illustrated in this diagram, or be constituted by devices different from the dental CAD 2000.

The control unit 2607 includes an inference target data acquisition unit 2608 that acquires inference target image data, and an inference unit 2609 including a trained inference model trained using teaching data including training image data that is captured of a tooth row including a missing area and ground truth data that is information about the color of the dental prosthetic to be disposed in the missing area in a pair. The inference unit 2609 is also characterized in inferring the color of the dental prosthetic corresponding to the inference target image data by inputting the inference target image data into the trained inference model. The information processing apparatus 2000 further includes a data generation unit 2610 that generates data on the dental prosthetic based on the inferred color of the dental prosthetic and the three-dimensional shape, and a display control unit 2611 for performing display processing of the generated data and the information about the color of the dental prosthetic inferred by the inference unit 2609 on the display unit 2606.

The functions of the data generation unit 2610 may be implemented by different apparatuses.

Figure 13:
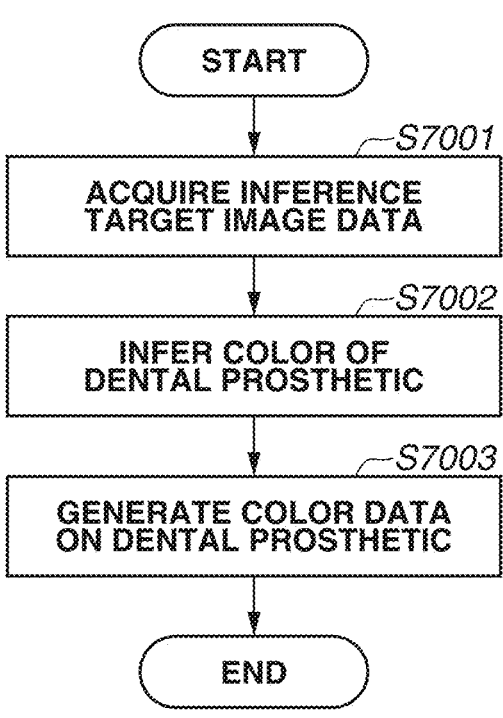
FIG. 13 is a flowchart of inference of color of a dental prosthetic by the information processing apparatus 2000 (dental CAD 2000) according to the present invention.

Now, a procedure where the information processing apparatus 2000 infers the color of the dental prosthetic and generates data will be described with reference to FIG. 13. The components of the information processing apparatus 2000 may be constituted by a plurality of devices. Only some of the components may be configured as an actual apparatus.

In step S7001, the inference target data acquisition unit 2608 acquires the inference target image data obtained by using the imaging unit. Having acquired the inference target image data, the inference target data acquisition unit 2608 transmits the inference target image data to the inference unit 2609. This step ends.

In step S7002, the inference unit 2609 infers the color of the dental prosthetic corresponding to the inference target image data by inputting the inference target image data into the trained inference model. The training here will be described below. The inference unit 2609 includes the trained inference model trained using the teaching data including the training image data that is captured of a tooth row including a missing area and the ground truth data that information about the color of the dental prosthetic to be disposed in the missing area in a pair. The inference model here is a model based on machine learning. Examples include a CNN-based model and a GAN-based model. The inference model of the inference unit 2609 may include a plurality of inference models. Suppose, for example, that the inference unit 2609 includes inference models for a case where the missing area is smaller than a predetermined value with respect to the tooth row and a case where the missing area is greater than the predetermined value separately. For example, the missing area refers to a value calculated by comparison between a tooth row based on standard dentition data and the tooth row including the missing area. If the missing area is large with respect to the tooth row, the color of the dental prosthetic to be disposed in the missing area can be favorably inferred by taking more into consideration the color of the teeth near the disposition target tooth and the corresponding tooth to be occluded. By contrast, if the missing area is small, the color can be favorably inferred by taking into consideration the color of the tooth for the dental prosthetic to be disposed. The provision of a plurality of inference models with different teaching data depending on the size of the missing area thus improves the inference accuracy of the color of the dental prosthetic.

The inference unit 2609 infers the color of the dental prosthetic and transmits the data to the data generation unit 2610. The data generation unit 2610 may be constituted by a different apparatus. The information processing apparatus 2000 may function as an independent apparatus implementing the functions described so far.

In step S7003, the data generation unit 2610 generates color data on the dental prosthetic based on the transmitted information about the color of the dental prosthetic, and displays the generated color data on the display unit 2606 via the display control unit 2611. The generated color data is also transmitted to the coloring apparatus 4000. As will be described below, the coloring apparatus 4000 colors a formed dental prosthetic based on the inferred color information.

Here, the inference unit 2609 may infer a plurality of candidates for the color of the surface of the dental prosthetic. In such a case, the display control unit 2611 displays the plurality of color candidates for the surface of the dental prosthetic on the display unit 2606. The display control unit 2611 can further acquire likelihood information about each color from the inference unit 2609, and display the plurality of color candidates along with the likelihood information. The control unit 2607 may perform selection acceptance by which the user can select color data from the plurality of color candidates via the operation unit 2605 and the like.

Figure 14:
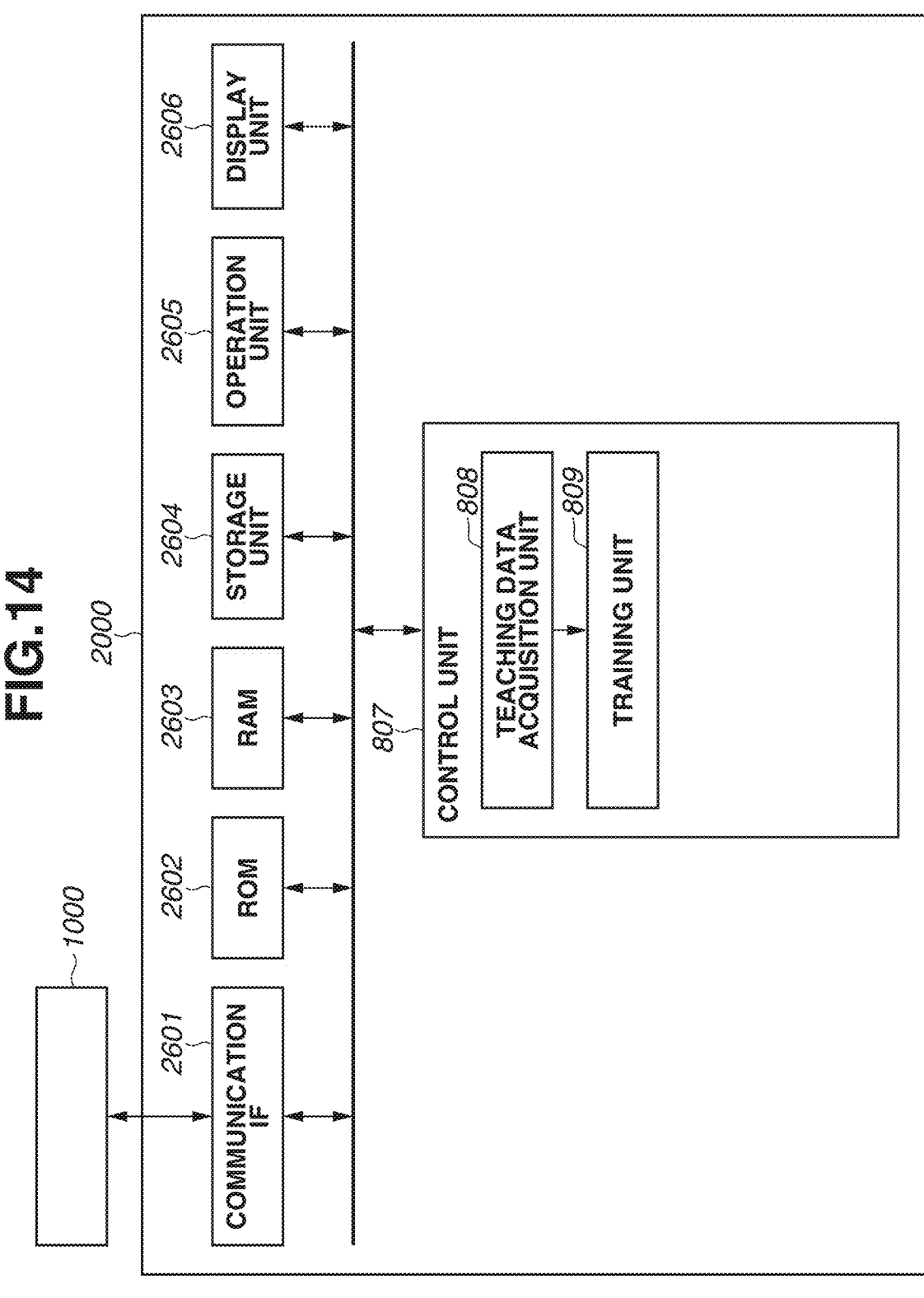
FIG. 14 is a schematic diagram during training of an inference model by the information processing apparatus 2000 (dental CAD 2000) according to the present invention.
Figure 15:
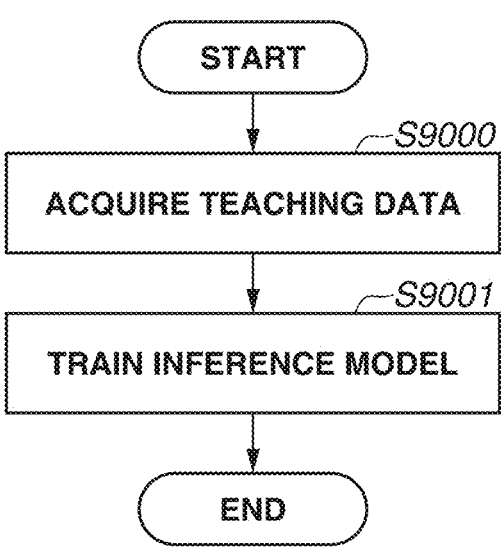
FIG. 15 is a flowchart of the training of the inference model by the information processing apparatus 2000 according to the present invention.

Now, a configuration for training the trained inference model in the inference unit 2609 will be described with reference to FIGS. 14 and 15. FIG. 14 illustrates a configuration of the information processing apparatus 2000 during training. A control unit 807 includes a teaching data acquisition unit 808 that acquires teaching data, and a training unit 809 that trains a machine learning-based inference model based on the acquired teaching data. The information processing apparatus including the inference unit 2609 and this information processing apparatus 2000 may be the same information processing apparatus or different information processing apparatuses. For example, the inference function is implemented by copying the trained inference model generated by the training unit 809 to the cloud or another information processing apparatus.

The training unit 809 trains the inference model to generate the trained inference model, and stores information about the model and information about the parameters obtained by the training into the storage unit 2604 in association with each other. The teaching data refers to data including training image data that is captured of a tooth row including a missing area and ground truth data that is information about the color of the dental prosthetic to be disposed in the missing area in a pair. The machine learning-based inference model may be a CNN-based model or a GAN-based model. If the inference model is a CNN-based model, the ground truth data is data including ground truth labels corresponding to pixels values indicating the color of the dental prosthetic. If the inference model is a GAN-based model, the ground truth data is image data on a tooth row. The training unit 809 generates the trained inference model by training using training images and ground truth data in pairs. The training procedure will now be described with reference to FIG. 15.

In step S9000, the teaching data acquisition unit 808 acquires the teaching data from the storage unit 2604 or the like. Here, the teaching data refers to data including the training image data and the ground truth data in pairs. The teaching data acquisition unit 808 transmits the teaching data to the training unit 809.

Here, the teaching data acquisition unit 808 may generate training image data by masking a partial area of a tooth row of a healthy person so that the masked area serves as a missing area. In such a case, the information about the masked color of the masked area is the ground truth data. The training image data may be extended by combining processes for modifying the size of the mask, the shape and angle of the mask, the size, angle, and brightness of the tooth row image, etc.

In step S9001, the training unit 809 generates a trained model by performing training processing on the inference model using the teaching data. Having generated the trained model, the training unit 809 stores information about the inference model and information about the parameters into the storage unit 2604 in association with each other. The training unit 809 may train a plurality of inference models depending on the size of the missing area with respect to the tooth row in the training image data. For example, the training unit 809 generates a first inference model trained with first teaching data including training image data where the missing area is smaller than or equal to a predetermined criterion with respect to the tooth row as teaching data. The training unit 809 also generates a second inference model trained with second teaching data including training image data where the missing area is greater than the predetermined criterion with respect to the tooth row as teaching data. Here, including means that the teaching data may include other teaching data, and an inference model additionally trained by different teaching data is also applicable to this application.

Figure 16:
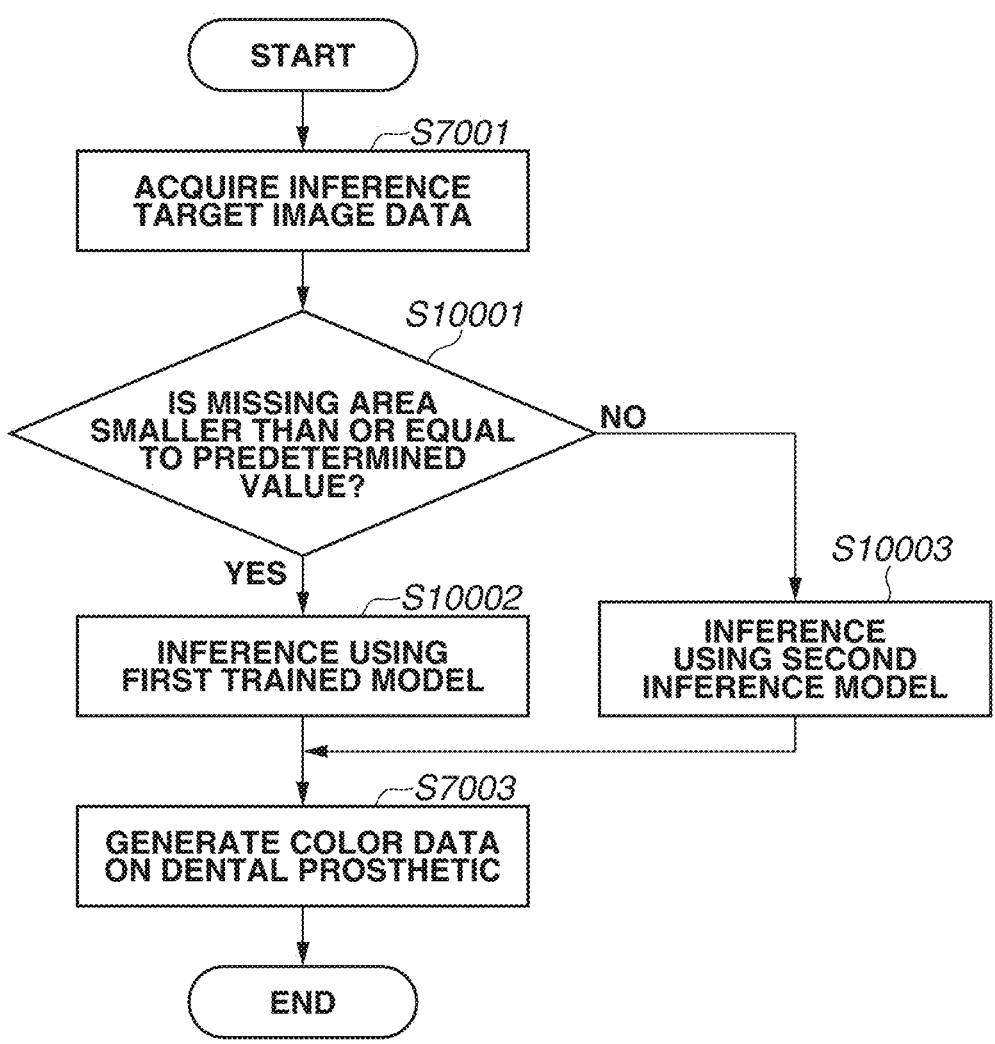
FIG. 16 is a flowchart illustrating a modification of the inference procedure according to the present invention.

Now, an inference procedure by the inference unit 2609 in the case where there is a plurality of models generated using different pieces of teaching data depending on the size of the missing area will be described with reference to FIG. 16. Here, processes similar to those of FIG. 13 are denoted by the same reference numerals, and a description thereof will be omitted as appropriate.

In step S10001, the inference unit 2609 calculates the size of the missing area with respect to the tooth row in the acquired inference target data. Here, the size of the missing area with respect to the tooth row refers to a value calculated by comparison between a tooth row based on standard dentition data and the tooth row including the missing area, for example. This processing may be substituted by an inference model for detecting a missing area. The inference unit 2609 determines whether the missing area with respect to the tooth row is smaller than or equal to a predetermined value. If the missing area is smaller than or equal to the predetermined value, the processing proceeds to step S10002 to infer the color of the dental prosthetic using the first inference model trained with the foregoing first teaching data. On the other hand, if the missing area has a value greater than the predetermined value, the processing proceeds to step S10003 to infer the color of the dental prosthetic using the second inference model trained with the foregoing second teaching data.

(Modification 2)

In the foregoing exemplary embodiment, the inference unit 2609 is described to select the inference model to infer depending on the missing area with respect to the tooth row and whether a training image with a predetermined size of missing area is included in the teaching data of the plurality of inference models, and make an inference.

Here, the plurality of trained models generated using different pieces of teaching data may be caused to infer image data for verification, and the accuracy of the plurality of trained inference models and the sizes of the missing areas may be stored in association with each other so that an inference is made using an inference model of high accuracy for the size of the missing area in the inference target image data. The color of the dental prosthetic can thereby be inferred from the inference target image data with higher accuracy.

<Dental CAM 3000>

An example of the configuration of the dental CAM 3000 will be described with reference to FIG. 8. A process for forming a dental prosthetic will be described with reference to FIG. 9.

The dental CAM 3000 includes a communication IF 701, a machining unit 702, a storage unit 703, an operation unit 704, a display unit 705, and a control unit 706. The control unit 706 includes a machining control unit 707 and a display control unit 708.

In step S801, the dental CAM 3000 receives the three-dimensional shape data generated by the dental CAD 2000 via the communication IF 701. The received three-dimensional shape data is stored in the storage unit 703. The dental CAM 3000 may further acquire the tooth color data. The tooth color data is used in the step described below.

In step S802, the dental CAM 3000 selects a desirable prosthetic base material based on the received three-dimensional shape data and color data. The selection of the prosthetic base material may be replaced with the selection of the base material by the user. In a case such as where a prosthetic base material is set in advance, this step may be omitted as appropriate. The prosthetic member selected by the dental CAM 3000 here is desirably a prosthetic base material similar to the tooth color data received from the dental CAD 2000 by the dental CAM 3000. For example, a prosthetic base material that is similar to the color data and has a high degree of whiteness is selected as the base material of the dental prosthetic. The base material of the dental prosthetic may contain ceramic and/or a resin.

In step S803, the dental CAM 3000 forms the dental prosthetic by controlling the machining unit 702 using the machining control unit 707 constituting the control unit 806 based on the received three-dimensional shape data to machine the dental prosthetic base material. The result of the machining and formation by the machining unit 702 can be displayed on the display unit 705 via the display control unit 708. Here, the machining unit 702 may form the dental prosthetic by cutting and/or grinding the prosthetic base material. The machining unit 702 may machine and form the dental prosthetic by repeating successive sintering or melting and curing of the material, or the prosthetic base material, by light irradiation. The machining unit 702 may form the dental prosthetic by additive manufacturing. The control unit 706 may be controlled via the operation unit 704. The dental prosthetic formed by the dental CAM 3000 is used in a coloring process by the coloring apparatus 4000.

<Coloring Apparatus 4000>

An example of the coloring apparatus 4000 for implementing the function of the coloring unit 400 in the dental prosthetic manufacturing system will be described with reference to FIG. 10. The coloring process of the dental prosthetic by this apparatus will be described with reference to FIG. 11.

The coloring apparatus 4000 includes a communication IF 901, an operation unit 902, a storage unit 903, a rotation unit 904, a discharge unit 905, and a control unit 906. The control unit 906 includes a position detection unit 907, a shape detection unit 908, a rotation control unit 909, and a discharge control unit 910.

A specific example of the process for coloring the formed dental prosthetic based on the color data generated by the data generation unit 200 will now be described with reference to FIG. 11.

In step S1001, the coloring apparatus 4000 receives the color data on the dental prosthetic generated by the information processing apparatus 2000 via the communication IF 901.

The coloring apparatus 4000 records the received color data in the storage unit 903. The coloring apparatus 4000 holds the dental prosthetic machined and formed by the dental CAM 3000 with the rotation unit 904. The position detection unit 907 detects position data on the dental prosthetic machined and formed by the dental CAM 3000. The shape detection unit 908 detects the shape of the dental prosthetic by receiving the position data on the dental prosthetic detected by the position detection unit 907 or the three-dimensional data from the dental CAD 2000. To combine the position data detected by the position detection unit 907 with the received three-dimensional shape data improves the detection accuracy of the shape of the dental prosthetic by the shape detection unit 908. The detection of the shape of the dental prosthetic by the shape detection unit 908 may be substituted by the reception of the three-dimensional shape data.

In step S1002, the coloring apparatus 4000 colors the surface of the dental prosthetic formed by the formation apparatus 3000 based on the color data generated by the information processing apparatus 2000. Specifically, the coloring apparatus 4000 colors the dental prosthetic machined and formed by the dental CAM 3000 with a coloring material based on the color data while controlling the rotation unit 904 using the rotation control unit 909 and controlling the discharge unit 905 using the discharge control unit 910 based on the shape of the dental prosthetic detected by the shape detection unit 908. With the dental prosthetic colored, the processing proceeds to step S1003. The discharge unit 905 may discharge the coloring material by inkjetting or spraying. The discharge unit 905 can use inkjetting if the amount of the coloring material is small. The discharge unit 905 can use spraying if the amount of the coloring material is large. The discharge unit 905 may ends. If the coloring processing is determined to not be completed, the processing proceeds to step S1002 to perform coloring processing.

Examples

The present invention will be described in more detail below by using examples. The present invention is not limited by the following examples.

Example 1

Three-dimensional modeling was performed by irradiating a material with Yb fiber laser, using tooth three-dimensional shape data. Powder 1 in Table 1 was used as the material. That the same prosthetic as the tooth three-dimensional shape data was successfully modeled was checked by using a three-dimensional shape measuring instrument. Using an inkjet printer, the modeled prosthetic was colored with a coloring material.

TABLE 1

| POWDER NAME | BASE MATERIAL | | ABSORBER | |
| | TYPE | COMPOUND RATIO [vol %] | TYPE | COMPOUND RATIO [vol %] |
| --- | --- | --- | --- | --- |
| EXAMPLE 1 POWDER 1 | $70.5SiO_2 \cdot 29.5Li_2CO_3$ | 97.13 | SiO | 2.87 |
| EXAMPLE 2 POWDER 2 | $Al_2O_3$ | 64.40 | $Ti_2O_3$ | 2.87 |
| | $Gd_2O_3$ | 32.73 | — | — | include an inkjet mechanism and a spray mechanism as switchable mechanisms. The coloring apparatus 4000 may use two or more types of coloring materials to color the dental prosthetic for improved reproducibility of the color data on the dental prosthetic. The coloring apparatus 4000 may further include an application unit (not illustrated) that applies the coloring material to the dental prosthetic. If the coloring apparatus 4000 applies the coloring material, the application unit may perform multilayer application using a plurality of different coloring materials. The multilayer application by the application unit improves the coloring reproducibility of the color data on the dental prosthetic. Moreover, coloring materials having respective different refractive indices may be used as the plurality of coloring materials. The use of coloring materials with different refractive indices in coloring the dental prosthetic enhances reflectance, and coloring reproducibility can be achieved with a small amount of application. The coloring material for the coloring apparatus 4000 to color the dental prosthetic with may be selected by referencing a lookup table linking tooth color data with coloring materials. If the coloring apparatus 4000 has the lookup table in advance, the computing cost related to the determination of the coloring material can be reduced. The coloring material may contain any one of B, Si, and a resin. The inclusion of B, Si, or the resin into the coloring material for coloring the dental prosthetic can provide a wide color space.

The coloring material for the coloring apparatus 4000 to color the dental prosthetic with may contain a scattering agent. The coloring using the scattering agent-containing coloring material can achieve coloring reproducibility with a smaller amount of application. A scattering agent having a high refractive index may be used as the scattering agent. At least one of $TiO_2$, $SiO_2$, and $ZrO_2$ may be included as the scattering agent having a high refractive index.

In step S1003, the coloring apparatus 4000 determines whether the coloring processing is completed. If the coloring processing is determined to be completed, this processing

Example 2

Like example 1, a prosthetic was fabricated using powder 2 as the material.

The usability of the prosthetics of examples 1 and 2 as dental prosthetics was confirmed.

(Modification 3)

The data generation unit 200 estimates the surface color, for example, using a camera output (Rw, Gw, Bw) under light source color of white as frequency information about the light emitted from the light source. The tooth surface color acquired by the camera of a tooth adjoining the tooth to be repaired by the prosthetic will be expressed by (R, G, B). The surface color of the tooth to be repaired by the prosthetic is estimated based on (R, G, B) in Eq. 1.

[Eq. 1]

$$\begin{pmatrix} R' \\ G' \\ B' \end{pmatrix} = \begin{pmatrix} 1/Rw & 0 & 0 \\ 0 & 1/Gw & 0 \\ 0 & 0 & 1/Bw \end{pmatrix} \begin{pmatrix} R \\ G \\ B \end{pmatrix} \qquad \text{Eq. 1}$$

(Modification 4)

The present invention is also implemented by performing the following processing. The processing includes supplying software (program) for implementing the functions of the foregoing exemplary embodiments to a system or an apparatus via a network or various types of storage media, and reading and executing the program by a computer (or CPU or microprocessor [MPU]) of the system or apparatus.

Other Exemplary Embodiments

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the color of a dental prosthetic to be formed can be estimated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A dental prosthetic color estimation method comprising:
   acquiring color information about teeth, the color information being obtained by using an imaging unit;
   estimating color of a surface of a dental prosthetic by a computing unit based on color information about at least one of a target tooth for the dental prosthetic to be disposed, a tooth near the target tooth, and a tooth corresponding to the target tooth; and
   performing coloring by a coloring apparatus based on the estimated color,
   wherein the estimating includes identifying a missing part of the teeth, and determining a tooth having the identified missing part as the target tooth for the dental prosthetic to be disposed,
   wherein the estimating includes estimating a degree of missing of the missing part of the tooth, and estimating the color of the dental prosthetic based on the degree of missing, and
   wherein the estimating includes, in a case where the degree of missing is high, estimating the color of the dental prosthetic by making a weight of the color information about the tooth near the target tooth or the tooth corresponding to the target tooth higher than in a case where the degree of missing is low.

2. The dental prosthetic color estimation method according to claim 1,
   wherein the acquiring includes further acquiring three-dimensional shape information about the teeth, and
   wherein the estimating includes estimating the color of the dental prosthetic based on the color information and the three-dimensional information about the teeth.

3. The dental prosthetic color estimation method according to claim 1, wherein the tooth near the target tooth is a tooth adjoining the target tooth in a tooth row on a same jaw as an upper or lower jaw where the target tooth is located.

4. The dental prosthetic color estimation method according to claim 1, wherein the tooth corresponding to the target tooth is a tooth located at a position of occlusion with the target tooth in a tooth row on a jaw different from an upper or lower jaw where the target tooth is located.

5. The dental prosthetic color estimation method according to claim 1, wherein the color of the dental prosthetic is estimated by interpolating color of the missing part from the color information about the teeth.

6. The dental prosthetic color estimation method according to claim 5, wherein the color of the missing part is estimated by inputting the color information about the target tooth into a tooth color model associating tooth color with shape information.

7. The dental prosthetic color estimation method according to claim 1, wherein the estimating includes estimating the color of the surface of the dental prosthetic using brightness data generated based on brightness information about at least one of the target tooth for the dental prosthetic to be disposed, a tooth near a position where the dental prosthetic is to be disposed, and a tooth corresponding to the tooth for the dental prosthetic to be disposed.

8. The dental prosthetic color estimation method according to claim 7, wherein the computing unit estimates the color of the dental prosthetic to fall between a maximum value and a minimum value of the brightness data.

9. The dental prosthetic color estimation method according to claim 1, wherein the color of the surface of the dental prosthetic is estimated based on appearance prediction data on the dental prosthetic seen from outside an oral cavity of a subject, the appearance prediction data being based on a position or orientation where the dental prosthetic is disposed.

10. The dental prosthetic color estimation method according to claim 1, wherein color having a hue b* lower than one(s) in color coordinates defined by an International Commission on Illumination (CIE) 1976 L*a*b* color system, the one(s) being included in the color data on the teeth, is estimated as color of a part of the surface of the dental prosthetic.

11. The dental prosthetic color estimation method according to claim 10, wherein the part is a tooth tip of the dental prosthetic and a portion near the tooth tip.

12. The dental prosthetic color estimation method according to claim 1, wherein the color of the surface of the dental prosthetic is estimated based on at least one of layout information about a light source, an intensity of light emitted from the light source, a frequency of the light, and a tint of the light.

13. The dental prosthetic color estimation method according to claim 1, wherein a coloring material associated by a lookup table is selected as a coloring material for the surface of the dental prosthetic to be colored, the lookup table linking estimated color of the surface of the dental prosthetic with a coloring material for the surface of the dental prosthetic to be colored.

14. A dental prosthetic color estimation method comprising:

acquiring color information about teeth, the color information being obtained by using an imaging unit;

estimating color of a surface of a dental prosthetic by a computing unit based on color information about at least one of a target tooth for the dental prosthetic to be disposed, a tooth near the target tooth, and a tooth corresponding to the target tooth; and performing coloring by a coloring apparatus based on the estimated color, wherein the estimating includes identifying a missing part of the teeth, and determining a tooth having the identified missing part as the target tooth for the dental prosthetic to be disposed, wherein the estimating includes estimating a degree of missing of the missing part of the tooth, and estimating the color of the dental prosthetic based on the degree of missing, and wherein the estimating includes, in a case where the degree of missing is low, estimating the color of the dental prosthetic by making a weight of the color information about the target tooth higher than in a case where the degree of missing is high.

15. An information processing apparatus comprising:

at least one processor; and at least one memory that is in communication with the at least one processor, wherein the at least one memory stores instructions for causing the at least one processor and the at least one memory to perform operations comprising:

acquiring color information about teeth; and estimating color of a surface of a dental prosthetic based on color information about at least one of a target tooth for a dental prosthetic to be disposed, a tooth near the target tooth, and a tooth corresponding to the target tooth;

wherein the estimating includes identifying a missing part of the teeth, and determining a tooth having the identified missing part as the target tooth for the dental prosthetic to be disposed, wherein the estimating includes estimating a degree of missing of the missing part of the tooth, and estimating the color of the dental prosthetic based on the degree of missing, and wherein the estimating includes, in a case where the degree of missing is high, estimating the color of the dental prosthetic by making a weight of the color information about the tooth near the target tooth or the tooth corresponding to the target tooth higher than in a case where the degree of missing is low.

16. An information processing apparatus comprising:

an inference unit including a trained inference model trained using teaching data including training image data that is captured of a tooth row including a missing area and ground truth data that is information about color of a dental prosthetic to be disposed in the missing area in a pair; and an inference target data acquisition unit configured to acquire inference target image data captured of a tooth row including a missing area, wherein the inference unit is configured to infer color of a dental prosthetic corresponding to the inference target image data by inputting the inference target image data into the trained inference model, wherein the training image data includes image data where a partial area of the tooth row is masked, the masked area serving as the missing area, and wherein the inference model is an inference model based on a generative adversarial network (GAN).

17. The information processing apparatus according to claim 16, further comprising:

a teaching data acquisition unit configured to acquire the teaching data; and a training unit configured to train the inference model based on machine learning using the acquired teaching data.

18. The information processing apparatus according to claim 16, wherein the inference model is an inference model based on a convolutional neural network (CNN).

19. The information processing apparatus according to claim 16, wherein the ground truth data is data including a ground truth label corresponding to a pixel value indicating the color of the dental prosthetic.

20. The information processing apparatus according to claim 16, wherein the teaching data includes the training image data with the masked area as the missing area, and image data on the tooth row as ground truth data.

21. An information processing apparatus comprising:

an inference unit including a trained inference model trained using teaching data including training image data that is captured of a tooth row including a missing area and ground truth data that is information about color of a dental prosthetic to be disposed in the missing area in a pair; and an inference target data acquisition unit configured to acquire inference target image data captured of a tooth row including a missing area, wherein the inference unit is configured to infer color of a dental prosthetic corresponding to the inference target image data by inputting the inference target image data into the trained inference model, and wherein the inference unit is configured to select an inference model to infer from a plurality of different trained inference models, and make an inference using the selected inference model.

22. The information processing apparatus according to claim 21, wherein the inference unit is configured to select the inference model from the plurality of trained models based on a size of the missing area of the tooth row in the inference target image data.

23. The information processing apparatus according to claim 22, wherein the inference unit is configured to select the inference model based on whether the size of the missing area with respect to the tooth row is greater than a predetermined value.

24. The information processing apparatus according to claim 23, wherein the plurality of inference models includes a first inference model trained based on first teaching data including training image data where the size of the missing area with respect to the tooth row is smaller than or equal to the predetermined value as teaching data and a second inference model trained based on second teaching data including training image data where the size of the missing area with respect to the tooth row is greater than the predetermined value as teaching data.

25. The information processing apparatus according to claim 21, wherein the inference unit is configured to cause the plurality of trained models to infer image data for verification, and select the model to infer for the inference target image data based on accuracy of inference of the image data for verification by the plurality of trained models and a size of the missing area of the tooth row in the image data for verification.

26. The information processing apparatus according to claim 21, wherein a size of the missing area is a value calculated by comparison between a tooth row based on standard dentition data and the tooth row including the missing area.

27. An information processing method comprising:

acquiring inference target image data captured of a tooth row including a missing area; and inferring color of a dental prosthetic by inputting the inference target image data into a trained inference model obtained by training an inference model based on machine learning using teaching data including training image data that is captured of a tooth row including a missing area and ground truth data that is information about color of a dental prosthetic to be disposed in the missing area in a pair, wherein the inferring is configured to select an inference model to infer from a plurality of different trained inference models, and make an inference using the selected inference model.

28. A non-transitory storage medium storing a program for performing the information processing method according to claim 27 by a computer.

* * * * *